(12) United States Patent
Boyd et al.

(10) Patent No.: US 7,858,552 B2
(45) Date of Patent: Dec. 28, 2010

(54) COMPOSITE CATALYTIC MATERIAL AND PROCESS FOR MANUFACTURE OF SUCH MATERIAL

(75) Inventors: Joel E. Boyd, Plainview, TX (US); Lori A. Pretzer, Glendale, AZ (US); Philip J. Carlson, Ames, IA (US)

(73) Assignee: Wayland Baptist University, Plainview, TX (US)

( * ) Notice: Subject to any disclaimer, the term of this patent is extended or adjusted under 35 U.S.C. 154(b) by 0 days.

(21) Appl. No.: 11/975,448

(22) Filed: Oct. 19, 2007

(65) Prior Publication Data
US 2009/0062109 A1 Mar. 5, 2009

Related U.S. Application Data (60) Provisional application No. 60/967,418, filed on Sep. 4, 2007.

(51) Int. Cl.
*B01J 31/00* (2006.01)

(52) U.S. Cl. .............. 502/159; 502/150; 502/182; 502/216; 502/232; 502/237; 502/305; 502/307; 502/308; 502/309; 502/310; 502/325; 502/329; 502/342; 502/343; 502/351; 502/352; 502/355

(58) Field of Classification Search .......... 502/159, 502/150, 182, 216, 232, 237, 305, 307–310, 502/325, 329, 342, 343, 351, 352, 355.5
See application file for complete search history.

(56) References Cited

U.S. PATENT DOCUMENTS

| 3,167,525 A | * | 1/1965 | Thomas ............... 523/300 |
| 6,217,999 B1 | * | 4/2001 | Zhang et al. ......... 428/312.6 |
| 2005/0233893 A1 | * | 10/2005 | Sakatani et al. ....... 502/150 |
| 2006/0145145 A1 | * | 7/2006 | Nishio .................. 257/40 |

OTHER PUBLICATIONS

"Titanium Dioxide Photocatalysis of Metals"; Poudyal, Clark and Brag; Pub. Date—unknown; pp. 1-4.
"Solvent Deposition of Titanium Dioxide on Acrylic for Photocatalytic Application"; Carlson, Pretzer & Boyd; American Chemical Society; Pub. Date—Oct. 13, 2007; pp. A-G.
"Suggested terms and definitions in photocatalysis and radiocatalysis"; Serpone & Emeline; International Journal of Photoenergy; vol. 4; Pub. Date—2002; pp. 91-131.

* cited by examiner

*Primary Examiner*—Steven Bos
*Assistant Examiner*—Pritesh Darji
(74) *Attorney, Agent, or Firm*—Baker Donelson Bearman Caldwell & Berkowitz PC (57) ABSTRACT

A composite catalytic material (and process for its manufacture) is provided which comprises a catalyst adhered to a polymeric support material. This composite catalytic material can be used to remove or degrade contaminants in water and to remove or degrade carbon monoxide or other airborne contaminants.

7 Claims, 8 Drawing Sheets

Table 1: Active Surface Area Parameters

|  | PVA | Acrylic | Glass |
|---|---|---|---|
| Titania Mass (g) | 0.0154 | 0.0126 | 0.0108 |
| Reaction Rate (ppm/min) | $1.82 \times 10^{-3}$ | $1.87 \times 10^{-2}$ | $1.56 \times 10^{-2}$ |
| **Effective Rate Constant, k\* (ppm/min/g)** | 0.118 | 1.48 | 1.44 |

Fig. 8

COMPOSITE CATALYTIC MATERIAL AND PROCESS FOR MANUFACTURE OF SUCH MATERIAL

This application claims the benefit of U.S. Provisional Patent Application Ser. No. 60/967,418, filed Sep. 4, 2007.

TECHNICAL FIELD

The present invention relates to a composite catalytic material. In a more specific aspect, the present invention relates to a composite catalytic material which comprises a catalyst adhered to a polymeric support material.

The present invention also relates to a process for the manufacture of such composite catalytic material.

This invention will be described with specific reference to titanium dioxide (also referred to as titania) as the catalyst. However, this invention should be understood as applicable to other catalysts as will be described in this application.

BACKGROUND OF THE INVENTION

In general terms, a catalyst is a substance which increases the rate of the reaction being catalyzed without being consumed in the reaction. Stated another way, catalysis is the acceleration of a reaction in the presence of a catalyst.

The activation of a catalyst is sometimes achieved through the absorption of light. A catalyst activated by the absorption of light is termed a photocatalyst.

As known in the industry, photocatalysis can be used to purify water, air and various surface for a variety of applications. Titania (titanium dioxide) has been shown to be a photocatalyst for use in reactions involving many inorganic and organic materials. Examples of these inorganic and organic materials are phenol, aromatics, organic dyes, surfactants, metals, herbicides, pesticides and bacteria.

With regard to photocatalysis, photocatalysts have previously been deposited on a support material. For example, titania has been deposited on non-transparent support materials (such as sand, metal oxides and clays), and the resultant product has demonstrated considerable photocatalytic activity. Titania has also been deposited on transparent support materials such as glass and quartz, but the durability of these deposited titania films is not sufficient for many applications.

Research in this industry has concluded that the support material should possess good optical properties and strong surface bonding with the catalyst without compromising the reactivity of the catalyst.

Therefore, in regard to catalysis and photocatalysis, there is a need for an improved composite which is comprised of an effective catalyst and a good support material.

SUMMARY OF THE INVENTION

Briefly described, the present invention provides an improved composite catalytic material which comprises a polymeric support material and a catalyst adhered to the polymeric support material.

The present invention also provides a process for the manufacture of this improved composite catalytic material.

When used in this application, the terms "catalytic", "catalysis" and "catalyst" will be understood to include photocatalytic, photocatalysis and photocatalyst.

DETAILED DESCRIPTION OF THE INVENTION

The present invention relates to a composite catalytic material which comprises a polymeric support material and a catalyst adhered to the polymeric support material.

The present invention also relates to the manufacture of a composite catalytic material by a process which comprises:
  A. forming a dispersion of a catalyst in an organic solvent;
  B. applying the dispersion to a polymeric support material; and
  C. evaporating the organic solvent, whereby the catalyst is adhered to the polymeric support material.

Further, the present invention relates to a process for adhering a catalyst to a polymeric support material by a process which comprises:
  A. forming a dispersion of a catalyst in an organic solvent:
  B. applying the dispersion to a polymeric support material; and
  C. evaporating the organic solvent, whereby the catalyst is adhered to the polymeric support material.

The catalysts useful in this invention are those catalysts/photocatalysts which function when deposited on a polymeric support material. Examples of those catalysts are:
  $TiO_2$—titanium dioxide (titania)
  ZnS—zinc sulfide
  $SrTiO_3$—strontium titanium oxide
  ZnO—zinc oxide
  $WO_3$—tungsten (VI) oxide
  CdS—cadmium sulfide
  $Fe_2O_3$—iron (III) oxide
  $SnO_3$—tin (IV) oxide
  $Al_2O_3$—aluminum oxide (alumina)
  Preferred catalysts are $TiO_2$ and $Al_2O_3$.
  Mixtures of two or more of these catalysts can be used.

In this invention, the catalysts are used in amounts necessary to achieve the objectives of specific applications. Some applications may require greater amounts of catalyst per unit area of support material than other applications.

In this invention, a useful polymeric support material should have good optical qualities; a convenient geometry for the catalytic reaction; provide for post-reaction separation of the composite catalytic material from the reactant solution; and strong surface bonding with the catalyst without decreasing the reactivity of the catalyst.

Preferably, the polymeric support material is lightweight, durable, cross-linked and resistant to chemical attack. Additionally, the support material should be transparent to the light which activates the photocatalyst.

Effective polymeric support materials for use in this invention include:
 poly(vinyl acetate)
 poly(vinyl chloride)
 polyethylene terephthalate
 acrylic polymers, such as poly(methyl methacrylate)
 polystyrene
 polyurethanes
 polyepoxies
 polycarbonates
 polypropylene For this invention, a preferred polymeric support material is an acrylic polymer such as poly(methyl methacrylate).

The thickness of the polymeric support material is determined by the application in which that material is used. Preferably, the thickness is from about 1.0 mm to about 10 mm.

The organic solvent used in this invention can be a single organic solvent or a mixture of two or more organic solvents. Examples of useful solvents include:

| | |
|---|---|
| acetone | benezene |
| toluene | 1,2-dichloroethane |
| carbon tetrachloride | 2-propanol |
| 3-pentanone | dimethyl ketone |
| cyclohexanone | acetonitrile |
| chlorobenzene | dimethyl formamide |
| o-, m- and p-xylene | phenol |
| tetrachloroethane | methanol |
| dichloromethane | tetrahydrofuran |
| methyl ethyl ketone | |

A preferred organic solvent is a mixture of dichloromethane and methanol in a 90:10 volume:volume ratio.

Effective organic solvents will disperse the catalyst and soften the surface of the polymeric support material. This softening of the surface permits the catalyst to adhere to the polymeric support material.

If two or more organic solvents are used, one strategy is to choose one solvent to enhance the dispersibility of the catalyst and the other solvent to soften the surface of the polymeric support material. The ratio between the solvents is not critical, provided the desired dispersion and softening effects are obtained.

The dispersion of the catalyst in the organic solvent can be applied to the polymeric support material by several methods, such as by spraying the dispersion onto the support material, dipping the support material into the dispersion, brushing the dispersion onto the support material and by otherwise coating the support material with the dispersion.

The composite catalytic material of this invention can be used in several ways, including placement on baffles in a reactor, placement on the interior walls of a reactor and in any format that results in contact between the catalyst and the materials to be involved in the catalyzed reaction(s).

Further, the composite catalytic material of this invention can be effectively used in many ways, such as in the photocatalytic purification of water to remove or degrade contaminants, in the sterilization of aqueous bacteria, in the removal or degradation of carbon monoxide or other airborne contaminants, etc.

The present invention is further illustrated by the following examples which are illustrative of certain embodiments that are designed to teach those of ordinary skill in this art how to practice this invention and to represent the best mode contemplated for carrying out this invention.

The materials used in the following examples are described as follows:
1. The titania (P-25) was in powder form and obtained from Evonik Degussa GmbH. This material has a surface area of 50 square meters/gram, was approximately 80 percent anatase and 20 percent rutile and has an average particle size of 30 nanometers.
2. The water was from a system available under the trademark MilliQ A-10 from Millipore Corporation.
3. The dichloromethane and methanol were from Fischer Scientific and were Optima grade and HPLC grade, respectively.
4. The poly(vinyl acetate) (99 percent PVA) was obtained from Acros Organics.
5. The acrylic material, poly(methylmethacrylate), was about 4.76 mm thick and was obtained from Cyro Industries under the trademark Acrylite OP-4.
6. The illumination sources were 400 watt mercury vapor lamps with glass jackets to minimize exposure of short wave ultraviolet light.
7. The glass used for titania support materials was borosilicate glass from Swift Glass Company. Sections (5 cm×7 cm) of the glass and acrylic support materials were used in all examples.
8. After deposition, each sample was rinsed with water for 1 minute to remove loosely bound titania.

EXAMPLE 1

$TiO_2$ Deposition on Acrylic

Titania dispersions were prepared at a concentration of 2.6% (w/v) with a solvent consisting of 90% (v/v) dichloromethane and 10% (v/v) methanol. The methanol is included to increase the amount of titania that can be dispersed in the solvent. These dispersions were sonicated in a bath for 5 minutes prior to use.

These titania dispersions were then sprayed with a compressed air sprayer onto the surface of the acrylic material, which was surface roughened with 120 grit sandpaper prior to the application of titania. (Titania films deposited on roughened acrylic surfaces are more durable and have greater photocatalytic activity than films deposited on non-roughened acrylic surfaces due to the increased surface area of the roughened acrylic.) All acrylic materials were cleaned with methanol prior to titania deposition to remove dust and other surface contaminants. An average of 0.0180 g of titania was deposited on each acrylic sample, yielding a sample average of 0.513 mg/cm2 of deposited titania.

The durability of the resulting titania film on the acrylic surface is sensitive to the distance from the sprayer to the acrylic surface and to the mix of air to solvent-titania dispersion during the application of the titania. (If the amount of solvent present in the sprayed aerosol is too low, or if the spray distance is large enough to allow the evaporation of the solvent prior to reaching the acrylic surface, the titania deposited is not sufficiently bound to the acrylic surface and poor film durability results.) The apparent optimal distance from the sprayer to the surface is approximately 15 cm. The optimized spraying technique applies a uniform sprayed coat that is delivered "wet" with a substantial amount of the solvent reaching the surface of the acrylic. With the proper spraying technique, the resulting titania films exhibit reproducible durability and photocatalytic activity.

EXAMPLE 2

Direct $TiO_2$ Deposition on Glass

The sandblasted glass supports were prepared for titania deposition by soaking overnight in a 5% nitric acid solution. After being thoroughly washed with water, the plates were then dried for 1 hr at 110° C. A 10% (w/v) aqueous dispersion of titania was then prepared by sonication for 30 minutes. The glass samples were then sprayed with this dispersion using the compressed air sprayer and dried for 30 minutes at 110° C. The samples were then re-sprayed with a second coat of titania before being heated to 300° C. at a rate of 9° C./minute. The samples were held at 300° C. for 3 hours before slowly cooling at the natural rate of the furnace. The glass supported samples retained an average of 0.0263 g of titania with an average of 0.751 mg/cm$^2$ of titania deposited.

EXAMPLE 3

$TiO_2$ Deposition on Glass with PVA Binder

Titania was also deposited on glass with the use of a poly (vinyl acetate) binder. A 9.1% (w/w) dispersion of titania in PVA was prepared at 85° C., by the addition of 1.0 g of $TiO_2$ and 10.0 g PVA to 100 mL of water. This dispersion was heated for 15 min and then applied to the surface of a cleaned, non-sandblasted borosilicate glass slide and smoothed to an average film thickness of 0.19 mm. The film was cured by heating at 110° C. for 2 hrs. A PVA reference sample that contained no titania was also prepared. After curing, the average mass of the PVA-titania film deposited on each sample was 0.2540 g, corresponding to a deposited titania mass of 0.0231 g, or 0.660 mg/cm$^2$ of deposited titania.

Procedure for Analysis

A. Scanning Electron Micrographs

Scanning electron micrographs were collected on a Hitachi S-3400N microscope. Images were collected at low magnification (90×) to assess surface uniformity and under higher magnification (3,000×) to allow the visualization of the titania-support interface wherever possible.

B. Film Durability

To assess the durability of the titania films, each sample was placed under a column of water falling freely from a height of 33 cm. The flow rate during these experiments was 870 ml/min, and the individual water exposure times varied from 1 min to 10 min. The total exposure time was 110 min. After each exposure the samples were shaken to remove excess water and then dried at ambient temperature under vacuum for 2.5 hrs. The mass of each sample was then determined, and the residual mass of the surface film after each washing step was calculated by subtracting the mass of the clean, dried support materials. A reference sample with no deposited titania was prepared for each deposition type and was carried through the entire process for comparison with the titania-coated samples.

C. Activity Analysis

Figure 1:
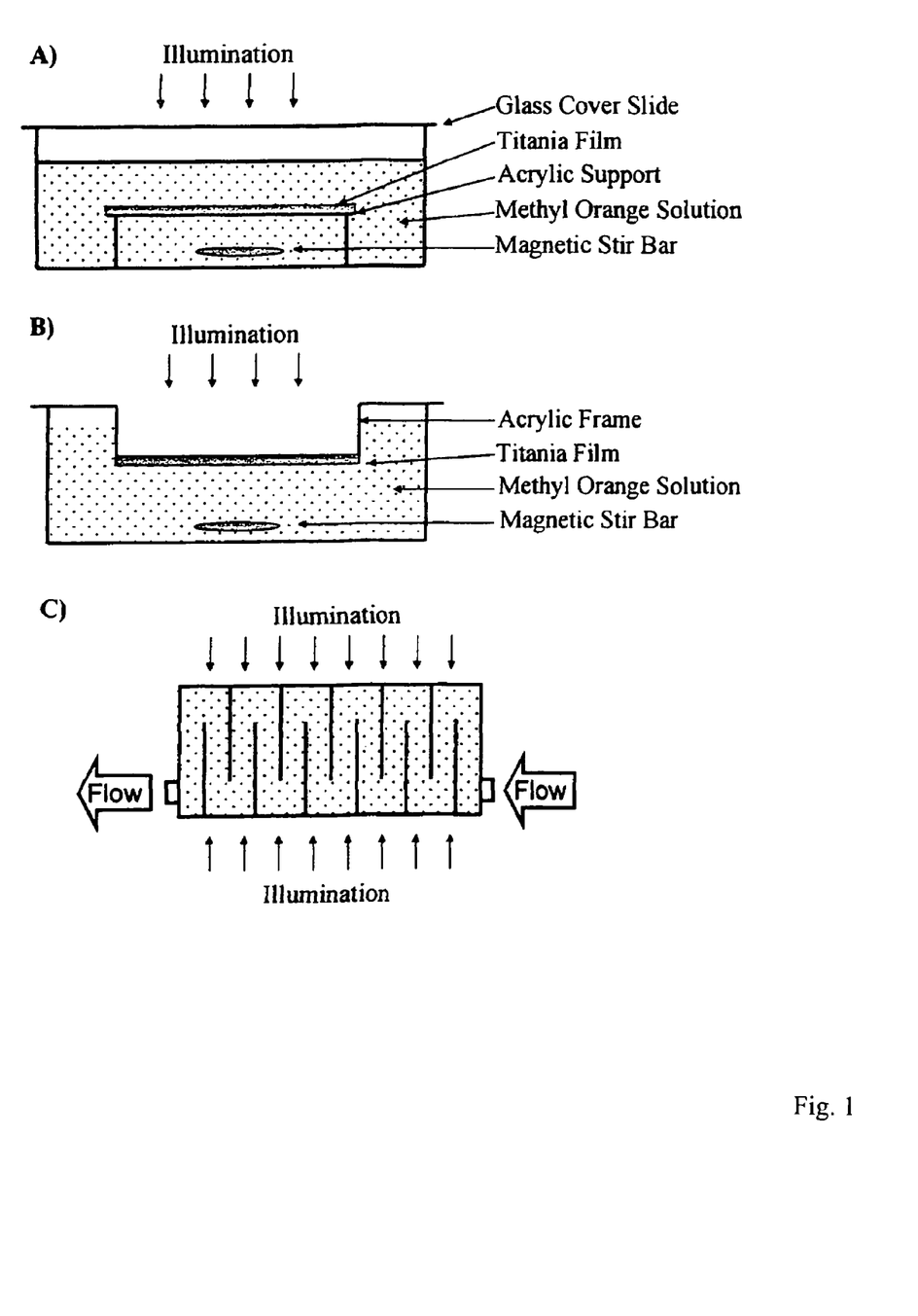
FIG. 1 shows a reactor diagram for activity analysis (A), film thickness optimization (B), and the titania-acrylic composite reactor (C).

The relative activity of titania deposited with the three techniques was probed by a series of experiments involving the photocatalytic degradation of methyl orange. Deposited titania samples were prepared and pre-washed for 1 minute to remove loosely bound titania using the procedure described above. The reactor diagram for these experiments is provided in FIG. 1A. The deposited titania samples were then submerged 1.5 cm below the surface of a 200 mL aqueous solution of 13.3 ppm methyl orange. To directly probe the activity of the deposited titania separately from the 7 ultraviolet transmission of the support, the samples were all positioned with the titania films towards the light source. The illumination thus reached the titania film without passing through the support material. The glass vessel containing the solution and sample was covered with a borosilicate glass slide and illuminated from above for 145 min. Samples were taken periodically, and the residual methyl orange concentration was determined spectrophotometrically at 464 nm. The solution was stirred continuously by a magnetic stir bar placed underneath the samples, and was maintained at 15° C. by the immersion of the reaction vessel in a constant temperature bath. The mass of titania on the PVA, acrylic and glass samples was 0.0154 g, 0.0126 g, and 0.0108 g, respectively.

The reaction order, m, was determined for the acrylic support materials by preparing eight 5 cm×7 cm samples that had varying masses of titania deposited upon the acrylic surface with consistent film thicknesses. To maintain a constant thickness of the titania film, these eight samples were prepared by masking off various portions of acrylic pieces prior to application of the solvent/titania dispersion. The masses of titania deposited on these samples ranged from 0.0059 g to 0.0184 g.

D. Film Thickness Optimization

The optimum titania film thickness can be expected to differ when the illumination is provided from the support side, versus illumination from the solution side of the titania film. Since the most likely reactor geometries employing titania-acrylic composite materials would involve illumination through the support, the optimum film thickness was determined under these conditions. FIG. 1B is the reactor diagram for the film thickness optimization experiments. For these experiments titania-acrylic samples that had been pre-washed for 1 minute were immersed in a 250 mL solution of 10 ppm methyl orange, and an acrylic frame was attached to each sample to allow the sample face that supported the titania film to be immersed without the solution covering the backside of the sample. In this way, the light could be administered to the titania film, through the support material, without traversing the methyl orange solution.

Five samples were prepared with titania film thicknesses of 0.252 mg/cm$^2$, 0.342 mg/cm$^2$, 0.492 mg/cm$^2$, 0.939 mg/cm$^2$, and 1.485 mg/cm$^2$. The methyl orange concentration was measured repeatedly over a period of 140 min. The solutions were stirred continuously, covered with a borosilicate glass slide, and maintained at 15° C. throughout each experiment.

E. Titania—Acrylic Composite Reactor

A simple distributive type reactor was constructed, and FIG. 1C shows the diagram of this reactor. The reactor was fabricated from titania/acrylic composite materials, and was used for the photocatalytic decomposition of methyl orange. 2.0 liters of a 13 ppm aqueous methyl orange solution was circulated through the reactor and sampled periodically. The pH of the solution was elevated to 12 with NaOH to optimize the degradation rate of methyl orange. The reactor was 20 cm×7 cm×7 cm and had a total internal solution volume of approximately 800 mL. Eleven internal fins (5 cm×7 cm) were inserted alternately on each wall to allow the aqueous solution to flow through the reactor. The reactor was assembled using dichloromethane as the adhesive solvent. With the exception of the two 7 cm×7 cm end pieces, every surface on the interior of the reactor was coated with titania. Titania having a mass of 0.75 g was spread over an internal surface area of approximately 1200 cm$^2$ providing a coverage of 0.625 mg/cm$^2$. The ends were fitted with hosebarb fittings for connection to the pump and sample reservoir via vinyl tubing.

A lamp was placed on either side of the reactor so that the light was coupled directly into the acrylic walls and fins of the reactor. The light is then dispersed to the titania without having to travel through the reaction solution. The refractive index of the acrylic is 1.49 compared to the refractive index of the titania which is 2.4-2.8; thus total internal reflectance within the fins should be avoided where the titania is in contact with the acrylic material, and remain possible where the acrylic might be in contact with water, which has a refractive index of 1.33. A submersible pump in a polypropylene solution reservoir was used to circulate the solution through the reactor with a flow rate of 8.7 L/min. The solution temperature in the reservoir was maintained at 25° C. throughout the reaction by immersing a loop of the vinyl tubing in between the reservoir and the reactor in a constant temperature bath.

Results of Analysis and Discussion (a) Ultraviolet Transmittance

Figure 2:
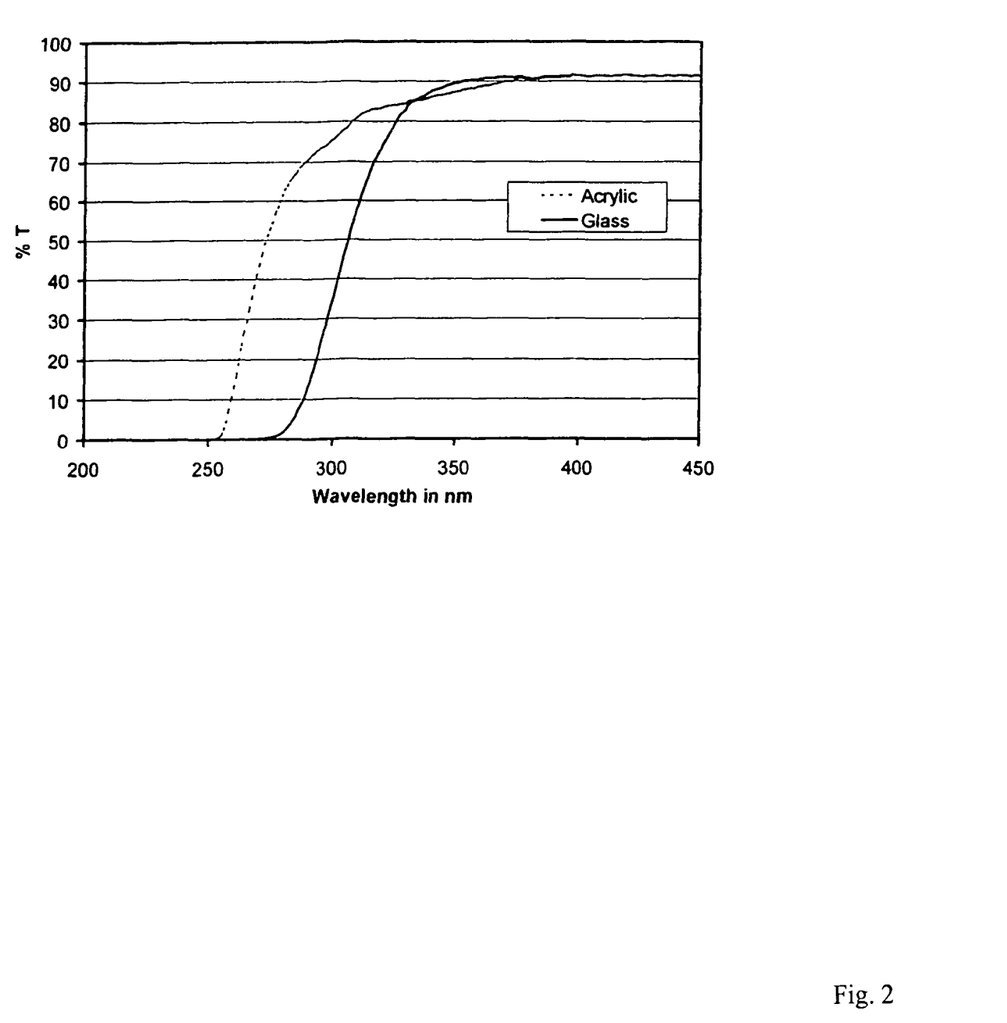
FIG. 2 shows an ultraviolet % transmittance of 4.76 mm thick acrylic and borosilicate glass.

FIG. 2 shows the ultraviolet transmittance (% T) of a 4.76 mm thick acrylic sample and a 4.76 mm thick borosilicate glass plate. The optical clarity of the acrylic materials extends deeper into the UV (50% T at 272 nm) than borosilicate glass (50% T at 306 nm). This is particularly important for titania photocatalysis since only $\lambda<380$ nm is utilized for excitation unless the titania is surface-modified or doped with metals or other sensitizers. Acrylic supported titania would be able to utilize a broader ultraviolet spectrum than titania supported on glass in reactor configurations where broad spectrum light is delivered to the photocatalyst through the support material.

(b) Scanning Electron Micrographs

Figure 3:
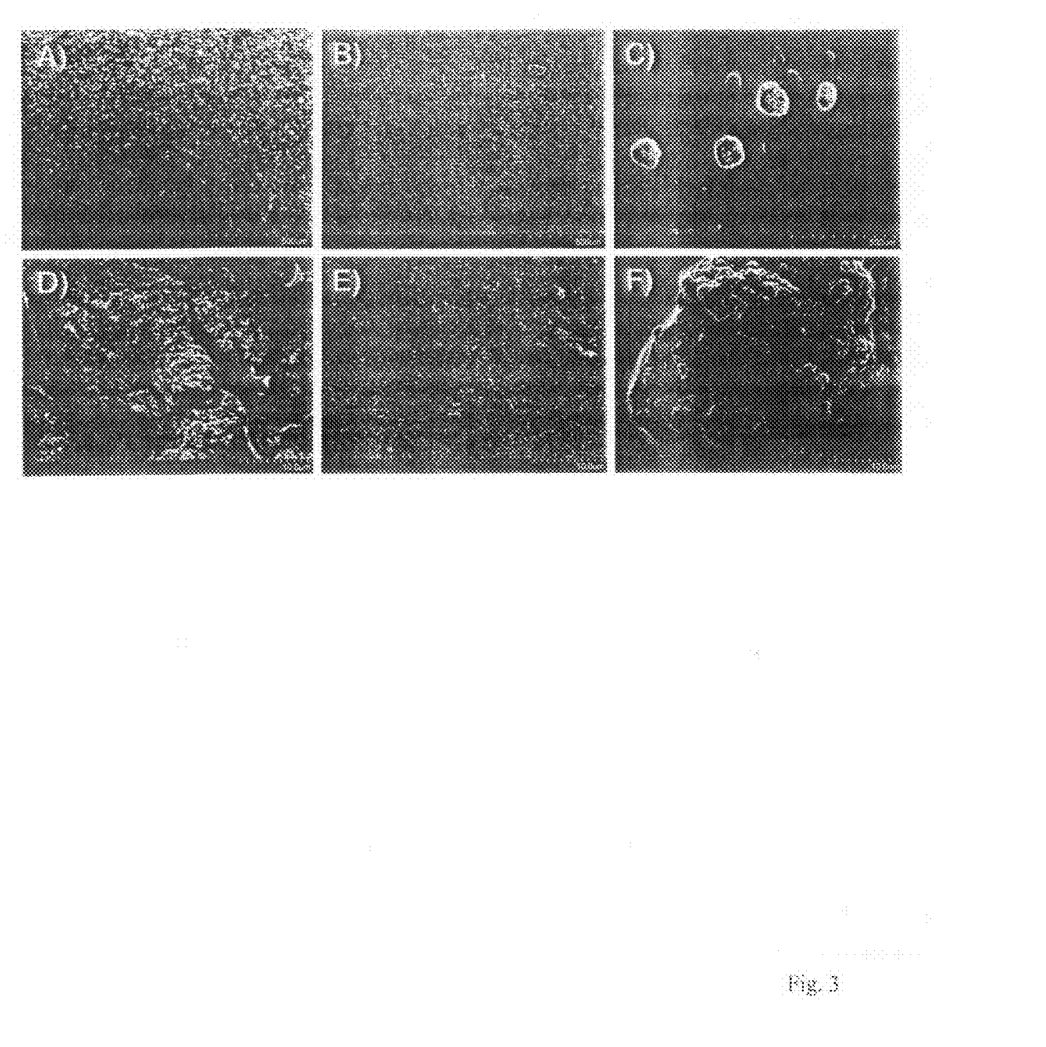
FIG. 3 shows scanning electron micrograph (SEM) images of titania deposited on sanded acrylic (A and D), directly on a sandblasted glass surface (B and E), and on glass with a PVA binder (C and F).

FIG. 3 shows SEM micrographs of the three different sample types at various magnifications. At low magnifications (FIG. 3A) the titania layer on the acrylic material appears fairly uniform with substantial roughness. Upon further magnification (FIG. 3D), the fissures in the titania layer can be seen. These fissures are presumably due to the stresses induced by the re-hardening of the acrylic as the solvent evaporates. The titania deposited directly on the surface of the glass (FIGS. 3B and 3E) shows the greatest surface uniformity at low and high magnification, with moderate cracking visible at high magnification.

The SEM images of the PVA samples (FIGS. 3C and 3F) clearly show the embedded nature of the titania in the PVA layer and that the titania particles tend to agglomerate in clusters within the PVA layer. FIG. 3C shows several titania clusters and the relative lack of any exposed titania outside of these clusters. FIG. 3F is a higher magnification image of one of these titania clusters, and it can be observed that there is some PVA covering even the outermost titania particles in the cluster. It is evident from these SEM micrographs that the titania in the PVA binder is highly embedded in the support material. The acrylic supported titania coating is less uniform than the titania coated directly on glass supports, but the exposed surface area of titania is comparable in the acrylic and glass supported titania films.

(c) Film Durability

A titania deposition method for photocatalytic application is of little utility if the deposited titania film does not remain adhered to the support during use. Since the most likely application of the acrylic-titania deposition method is in a water treatment environment (although gas phase remediation would be possible as well), the titania-substrate adhesion was tested with the film durability test described earlier. The choice of drying method in between water exposures was complicated by the fact that the temperature required to remove the sorbed water completely from the 10 PVA films was sufficient to induce continual mass reduction of even uncoated acrylic samples. The drying method chosen (evacuation at ambient temperature) resulted in a constant, un-removed fraction of water from the PVA films, but allowed the mass of the acrylic samples to be determined without heat induced mass loss. Control samples of acrylic and PVA-coated glass without any titania confirmed this approach was successful. The mass of the acrylic control sample remained within 99.96% of the original mass throughout the process of repeated washing and drying.

Figure 4:
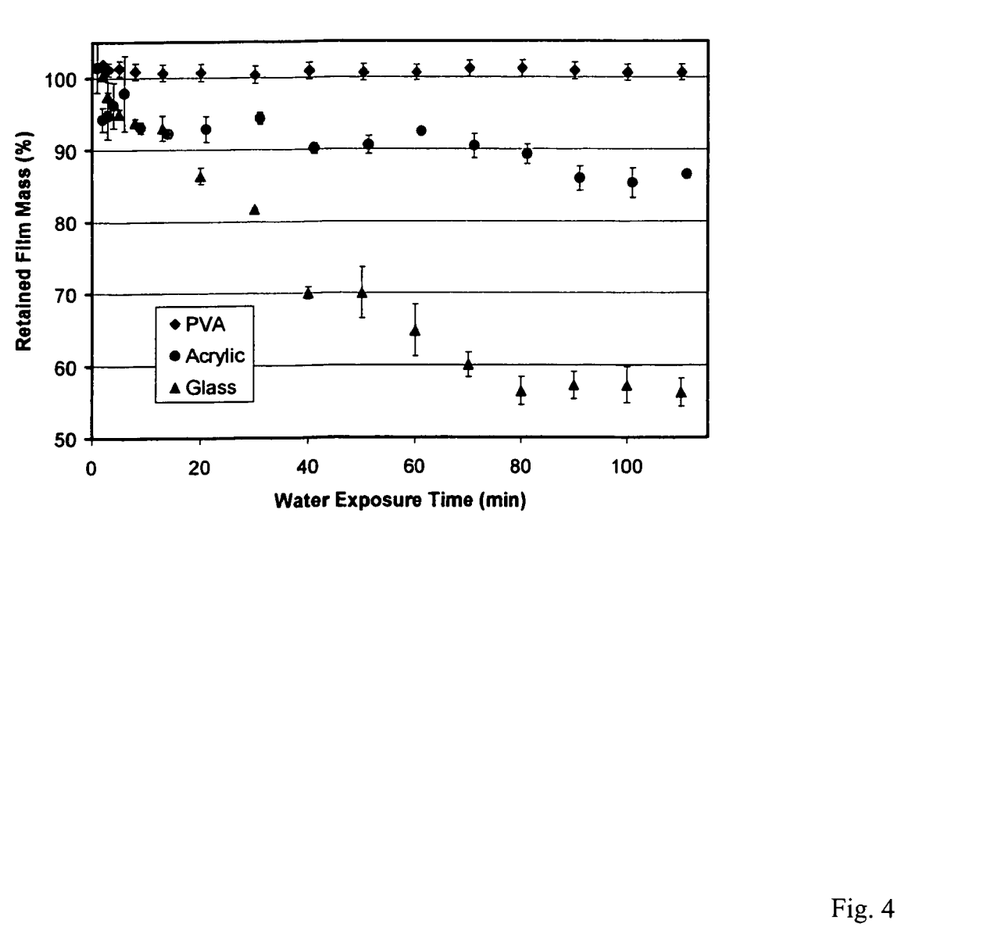
FIG. 4 shows the amount of titania remaining on the surface of the support material as a function of cumulative exposure to a falling water column. The values for the PVA samples in excess of 100% are due to water sorbed by the PVA that was not removed by the drying process. The error bars represent one standard deviation.

The PVA coated control showed a similar mass gain to the PVA samples containing titania. FIG. 4 shows the mass of the surface film retained by the support material as a percentage of the mass of the surface film after the preliminary rinse. It should be pointed out that the surface film for the PVA sample is comprised of PVA and titania, whereas for the other two sample types the film is solely titania. There is clearly a difference in adhesion strength among these three deposition techniques. The samples with the PVA binders showed negligible loss in film mass; in fact they showed a slight increase in mass presumably due to small amounts of water sorbed by the PVA. The PVA samples did show substantial blistering and localized delamination from the glass support slide during the longest water exposures. The delamination was eliminated upon drying with no other apparent adverse effects due to the delamination.

The mass of the titania films remaining on the acrylic slides was approximately 87% of the original titania mass after 110 min of vigorous water exposure. Samples of titania on glass with no binder exhibited a slow loss of titania leveling off at a retention of 56% of the original titania mass. Following the final exposure and weighing cycle, one sample of each type was washed for 10 seconds with water, allowed to rest for 10 seconds, and then lightly rubbed on its titania coated surface with a Kimwipe® for 30 seconds, followed by a 10 seconds water rinse. These samples were then dried as before and their masses were determined again. The PVA supported samples showed no change in mass from this process. The acrylic and glass supported samples retained 64% and 36% of the original titania mass respectively after this direct-contact abrasion. This type of direct physical contact is not a likely or desirable scenario in most reactor designs, but it does illuminate the existence of a very real difference in titania binding strength to the glass and polymeric materials.

(d) Activity Analysis

To determine which type of composite material provides the highest photocatalytic activity, a series of simple experiments was carried out comparing the ability of these materials to degrade aqueous methyl orange solutions. Not all of the titania present in the reactor has access to both photons and the methyl orange in solution. Some of this titania is buried beneath other titania and, in the case of the polymeric support materials, some titania may be embedded in the support surface. The rate of methyl orange degradation is expected to be dependent on the amount of active titania present, and on the magnitude of the rate constant under the reaction conditions of constant initial methyl orange concentration and constant illumination intensity. The slope of the plot of the log of the reaction rate as a function of the log of the titania mass was measured to determine the value of m. This value was experimentally determined to be 0.997, and thus first order behavior was assumed for all calculations.

Figure 5:
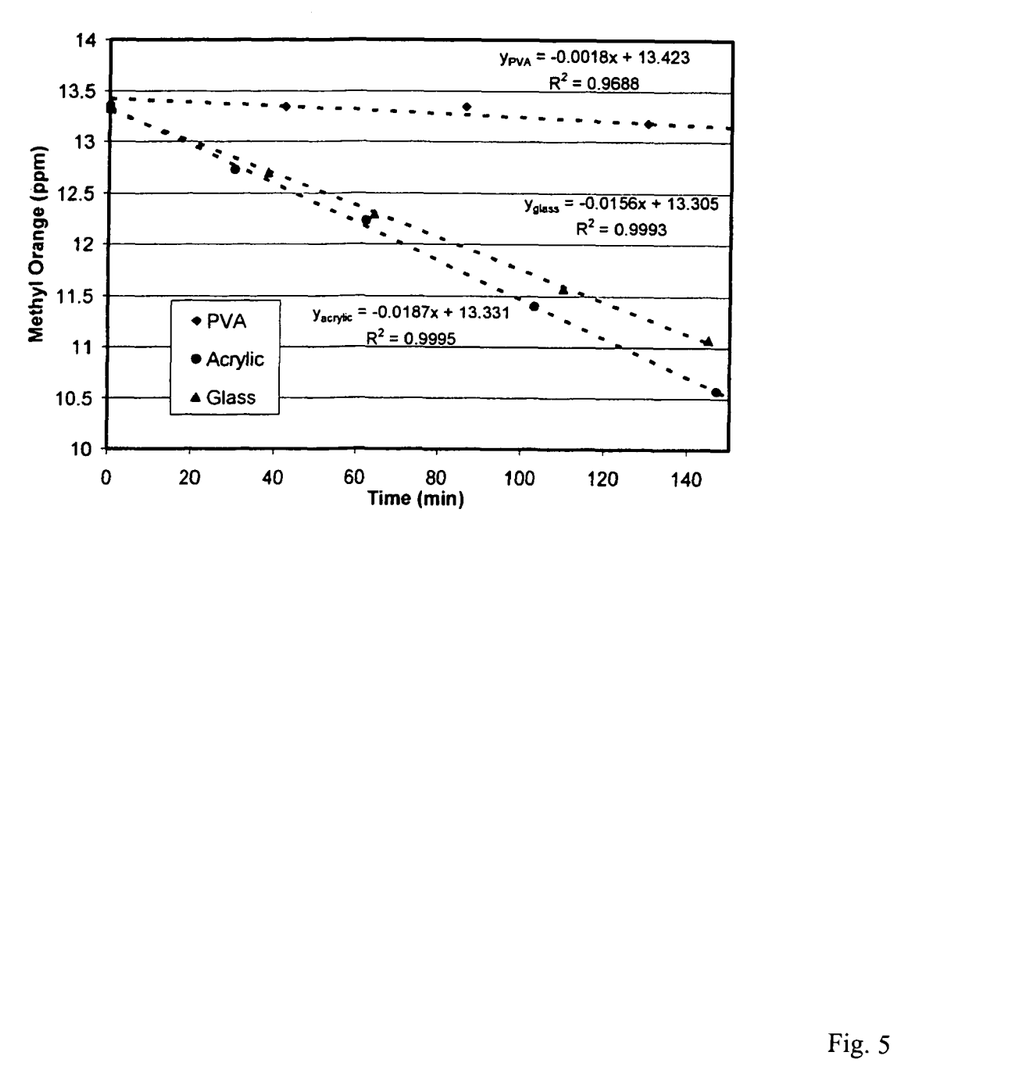
FIG. 5 shows a concentration of methyl orange as a function of photoexposure for PVA, acrylic and glass samples. The equation of the linear fit to each data set is provided next to each line. Those reaction rates and titania masses are provided in Table 1 (FIG. 8).
Figure 8:
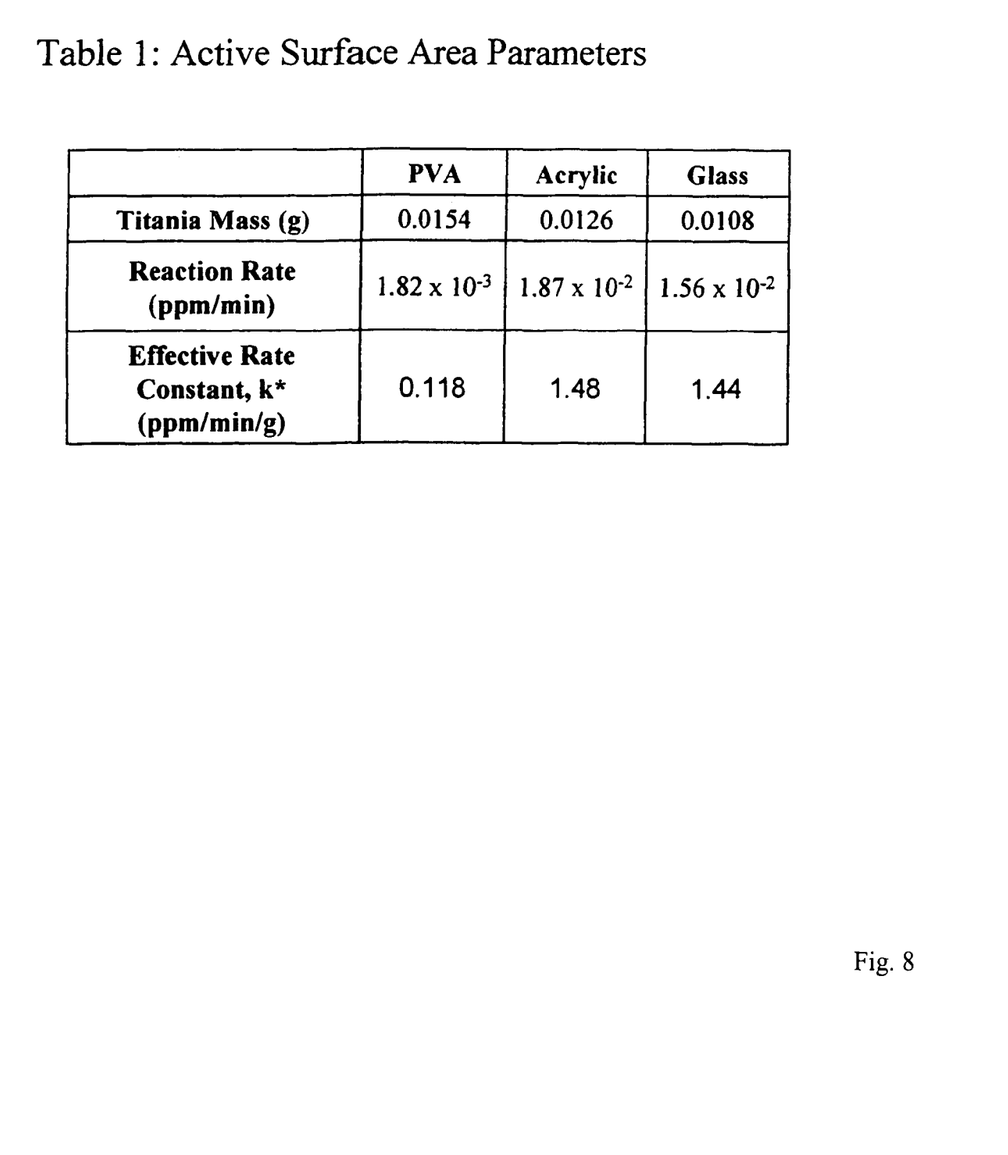
FIG. 8 is Table 1 which shows the active surface parameters.

FIG. 5 shows the concentration of methyl orange upon irradiation in the presence of the titania deposited on acrylic, glass and PVA supports. The decomposition rates for these reactions, the slopes of the lines in FIG. 5, are included in Table 1 along with the masses of titania present on each sample. After dividing the reaction rates by the titania mass, the effective rate constant, k*, for each sample can be determined. These values for k* are a direct probe of the relative reactivity of the various deposition techniques. The activity of the titania layer is sensitive to the film thickness. Relatively thin layers obviously have the largest value of k*, and for that reason the mass of titania deposited on each sample was kept small and as uniform as possible.

As expected based on visual inspection of the SEM micrographs, the activity of the PVA bound titania is substantially lower than with the other deposition methods. This is presumably due to the embedded nature of the titania in the PVA layer. The k* values for the acrylic and glass samples on the other hand are fairly comparable. The fact that the k* value for glass is 97% of the k* value for the acrylic sample is consistent with the SEM images which do not reveal substantial differences between the acrylic and glass samples.

(e) Film Thickness Optimization

Figure 6:
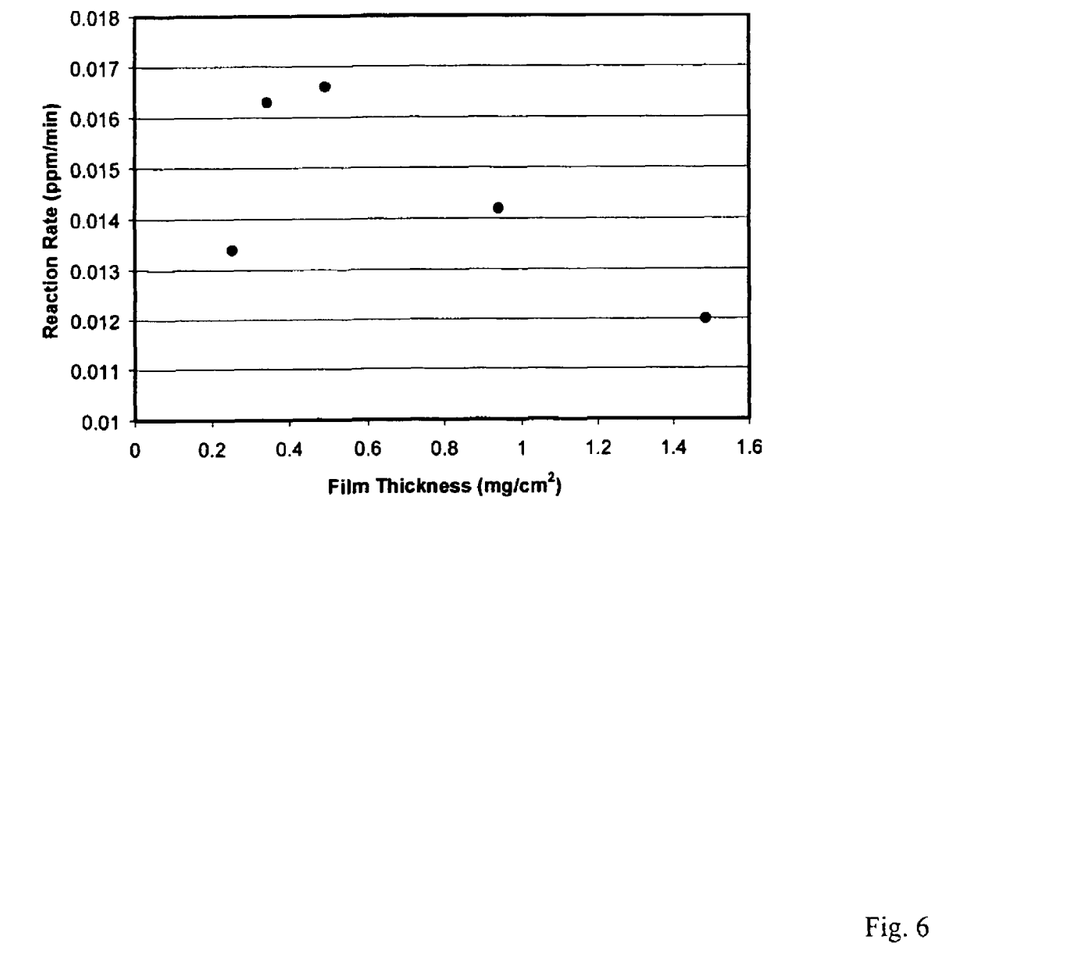
FIG. 6 shows a methyl orange degradation rate as a function of the titania film thickness when illuminated through the acrylic support material.

FIG. 6 shows the methyl orange degradation rate for five samples of varying titania film thicknesses when illuminated from the support side of the composite. The optimum film thickness from these experiments was observed to be 0.50 mg/cm$^2$. These results are entirely consistent with a previous report of optimum film thickness of 0.52 mg/cm$^2$ for P-25 titania deposited on glass supports for the degradation of Eosin B under illumination through the support. The photocatalytic activity of the titania film climbs rapidly with increasing film thickness until a maximum has been reached, beyond which point the electron-hole pairs are being formed at an appreciable distance from the titania-solution interface and are not available at the surface for catalysis. Titania-acrylic composite reactors can be expected to have a maximum reactivity when the titania film thickness is maintained near this optimum of 0.5 mg/cm2. No direct photolysis of methyl orange was observed in control experiments where a roughened acrylic sample was utilized without a titania layer deposited on the surface. An additional experiment involving a titania coated sample in the dark did not show a measurable decrease in the methyl orange concentration. The reduction in methyl orange concentration observed was thus due to the photocatalytic activity of the titania and not to direct photolysis, or adsorption of methyl orange on the titania or reactor surfaces.

(f) Titania—Acrylic Composite Reactor

Figure 7:
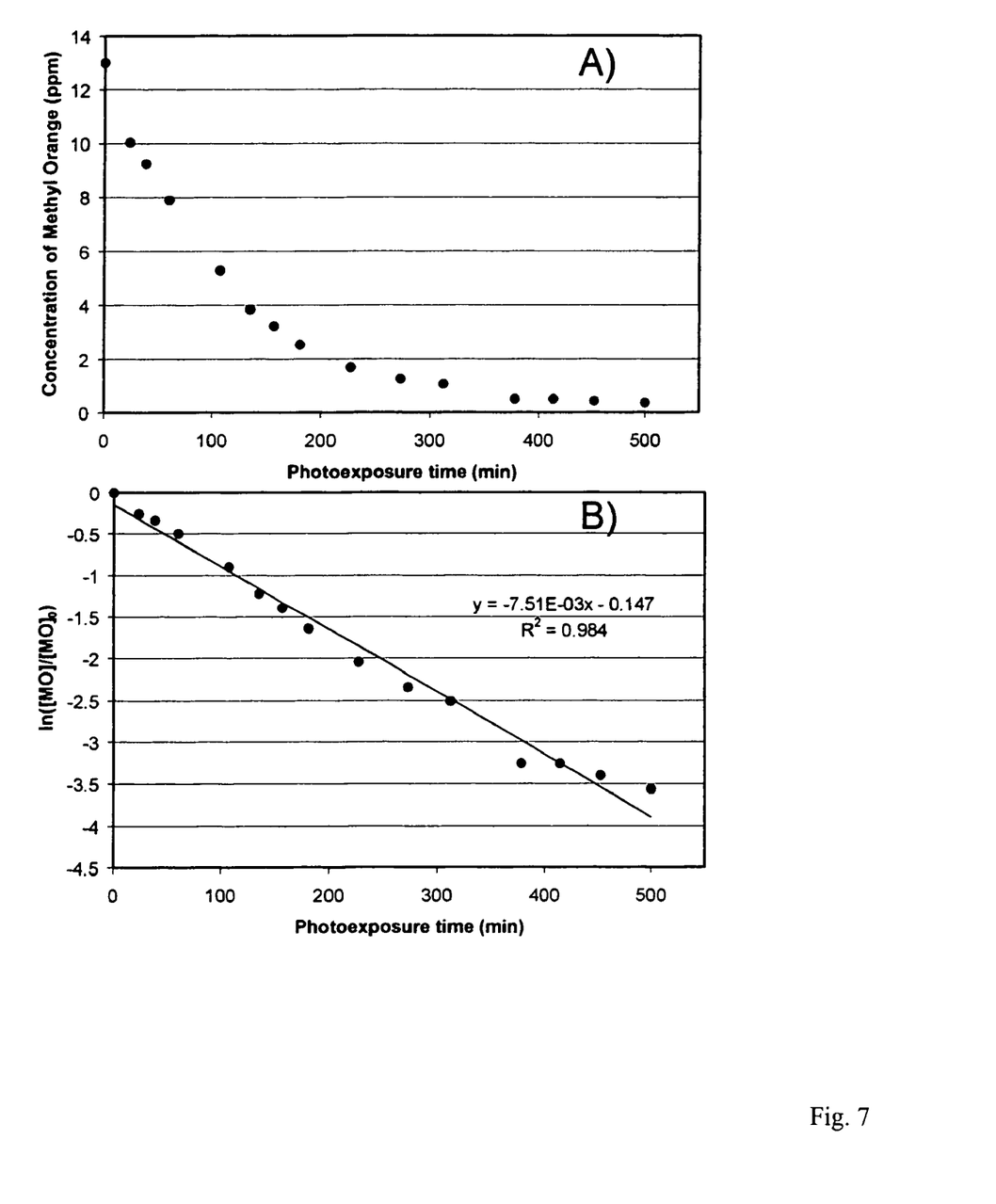
FIG. 7 shows (A) a concentration of methyl orange as a function of photoexposure for 2.0 of a 13 ppm solution in the distributive type reactor described in the text and (B) $\ln([MO]/[MO]_0)$ as a function of photoexposure time providing the pseudo-first order rate constant as the slope of the least squares linear fit.

To demonstrate the viability of the titania/acrylic composite materials for application, the reactor described earlier was utilized for the degradation of methyl orange. FIG. 7 shows the decolorization of methyl orange in this reactor. The methyl orange was 97.2% degraded by the end of 500 minutes of photoexposure. This data is modeled well by a simple exponential decay yielding a pseudo-$1^{st}$ order rate constant of $7.51 \times 10^{-3}$ min$^{-1}$. This reactor was utilized repeatedly under these conditions, and no loss of reactivity was evidenced including after a 240 hr period in which a NaOH solution with a pH of 12 was continually re-circulated through the reactor. This is an important issue, due to the high pH levels used in this reactor, because titania-glass films tend to degrade at a pH greater than 11. The titania-acrylic materials used in this study do not appear to suffer titania loss at a pH of 12.

In a separate experiment, the titania deposited on glass supports was completely removed after 104 hrs of exposure to a NaOH solution with a pH of 12, whereas the titania deposited on acrylic lost no mass during this time. Photocatalysis at high pH is reported in the literature, and thus the high-pH stability of a deposition method is of substantial importance. As demonstrated by the sustained activity of the reactors with repeated use, there is no evidence to date that the titania deposited on acrylic supports actively degrades the polymer surface. This resistance to photodegradation may be due to the highly crosslinked nature of the acrylic materials used.

The ease with which this reactor can be constructed from acrylic sheets is worth noting. This reactor design can be manufactured from acrylic sheet materials simply by cutting the six walls of the box, solvent-welding the fins to each side of the reactor, applying the titania-solvent dispersion, and completing the assembly of the box. The excellent optical clarity of the solvent-welded bond between the wall of the reactor and the edge of the fin makes the coupling of the light from the outside of the box to the interior of the fins highly efficient. The resulting reactor can be applied to innumerable aqueous substrates or could even be adapted for use with gas phase heterogeneous catalysis. A metal-doped reactor can be fabricated by applying pre-doped titania dispersions, or by simply coating the reactor interior with titania and then metal doping the titania coating by photodeposition. No attempt was made to optimize the reactor design for methyl orange degradation. The surface area to volume ratio of this particular reactor is very low, and no attempt to optimize flow rates for improved degradation rates was made. Reactor design optimization would clearly result in much faster degradation rates. The reactor design used was sufficient to demonstrate the viability of the titania-acrylic composite materials for photocatalysis.

The above examples and accompanying discussion, taken in conjunction with FIGS. 1-8, show that the acrylic-supported titania has (a) greater durability than the glass-supported materials and (b) comparable photocatalytic activity.

The present invention has been described in detail with particular reference to certain embodiments, but variations and modifications can be made without departing from the spirit and scope of the invention as defined in the following claims.

This work was funded in part by a grant (No. BW-0044) from The Welch Foundation.

What is claimed is:

1. A process for adhering a catalyst selected from the group consisting of titanium dioxide, zinc sulfide, strontium titanium dioxide, zinc oxide, tungsten (VI) oxide, cadmium sulfide, iron (III) oxide, tin (IV) oxide, aluminum oxide and mixtures of two or more of such catalysts to a polymeric support material, wherein the process comprises the following steps:

A. forming a dispersion of the catalyst in an organic solvent selected from the group consisting of acetone, toluene, carbon tetrachloride, 3-pentanone, cyclohexanone, chlorobenzene, o-xylene, m-xylene, p-xylene, tetrachloroethane, dichloromethane, methyl ethyl ketone, benzene, 1,2-dichloroethane, 2-propanol dimethyl ketone, acetonitrile, dimethyl formamide, phenol, methanol, tetrahydrofuran and mixtures of two or more of such organic solvents;

B. applying the dispersion to an acrylic polymer support material; and

C. evaporating the organic solvent, wherein the surface of an acrylic polymer support material is softened by the organic solvent, which permits the catalyst to adhere to the softened surface of the polymeric support material.

2. A process as defined by claim 1 wherein the catalyst is titanium dioxide.

3. A process as defined by claim 1 wherein the catalyst is aluminum oxide.

4. A process as defined by claim 1 wherein the catalyst is zinc sulfide, strontium titanium oxide, zinc oxide, tungsten (VI) oxide, cadmium sulfide, iron (III) oxide or tin (IV) oxide.

5. A process as defined by claim 1 wherein the organic solvent is a mixture of phenol and tetrachloroethane.

6. A process as defined by claim 1 wherein the organic solvent is a mixture of dichloromethane and methanol.

7. A process as defined by claim 1 wherein the acrylic polymer support material is poly(methyl methacrylate).

* * * * *